United States Patent

Boakes

[11] Patent Number: 5,963,636
[45] Date of Patent: Oct. 5, 1999

[54] SYSTEM AND METHOD FOR PROGRAMMING NUMBERS INTO THE AUTODIAL MEMORY OF A TELEPHONE

[75] Inventor: Edward W. Boakes, Middletown, N.J.

[73] Assignee: Lucent Technologies Inc., Murray Hill, N.J.

[21] Appl. No.: 08/808,371

[22] Filed: Feb. 28, 1997

[51] Int. Cl.⁶ .................................................. H04M 1/00
[52] U.S. Cl. ............................ 379/355; 379/67; 379/354
[58] Field of Search ............................. 379/67, 216, 354, 379/355

[56] References Cited

U.S. PATENT DOCUMENTS

| 4,860,339 | 8/1989 | D'Agosto, III et al. | 379/67 |
| 5,526,424 | 6/1996 | Karnowski | 379/355 |

OTHER PUBLICATIONS

Sony Cordless Telephone with Answering System "Operating Instructions, Manual of Instruction" Model SPP–A400, 1997 by Sony Corp., 1997.

Primary Examiner—N. Le
Assistant Examiner—Shihwen Hsieh

[57] ABSTRACT

A telephone having a repertory dialing capacity and the associated method of programming new number sequences into the repertory dialing memory of the telephone. The telephone includes dialing keys, function keys and may include memory access keys. The dialing keys are used to dial the telephone. The memory access keys, if present, or a corresponding key sequence, is used to selectively retrieve stored number sequences from the repertory dialing memory. The function keys are used to switch the telephone between an operational state, wherein said dialing keys are used to dial, and a program state wherein said dialing keys are used to enter number sequences into the repertory dialing memory. A controller contained within the telephone provides access to the repertory dialing memory and enables a new number sequence to be entered into the repertory dialing memory, provided one of a plurality of key event sequences occur. The key event sequences include a key event from a function key to switch the telephone into its program state, the entering of a number sequence and the assignment of the new number sequence to one of the repertory storage locations, all occurring in one of several orders.

25 Claims, 8 Drawing Sheets

SYSTEM AND METHOD FOR PROGRAMMING NUMBERS INTO THE AUTODIAL MEMORY OF A TELEPHONE

BACKGROUND OF THE INVENTION

1. Field of the Invention.

The present invention relates to systems and methods that enable numbers to be stored into the autodialing repertory of a telephone. More specifically, the present invention relates to systems and methods having flexible programming architectures that enable numbers to be stored into the memory of a telephone in more than one manner.

2. Prior Art Statement.

Many modern telephones have a repertory dialing capacity that enables pre-programmed numbers to be stored in memory. The pre-programmed numbers can then be automatically dialed by pressing a dedicated key or by pressing an appropriate sequence of keys on the telephone's keypad. Although many telephones have such a repertory dialing capacity, there exists no one standard programming architecture that governs how numbers are programmed into the memory of a telephone. Some telephone systems require a complex sequence of key strokes in order to enter a number into memory. As such, a user must refer to an instruction manual to learn how to enter numbers into memory. Since the numbers stored in the memory of a telephone are not often changed, a user rarely remembers how to enter numbers into memory and must retain the instruction manual indefinitely for this purpose. If a user loses the instruction manual, the user often stops updating the telephone's memory until the repertory dialing feature serves little or no function.

Most modern telephones contain twelve dialing keys arranged on a key dialing keypad. The twelve dialing keys include a separate key for the numbers 0 through 9 plus a pound (#) key and an asterisk (*) key. However, in addition to the dialing keypad, many telephones contain a large variety of secondary keys that are used to control various functions of the telephone. For example, many telephone have "hold" keys and "transfer" keys so that calls can be transferred from one telephone in a system to another. Telephones having a repertory dialing capacity often contain several secondary keys that are used solely for entering numbers into and retrieving numbers from a number storage memory. For example, many telephones have a bank of memory access keys next to which a person's name or number may be written. By pressing any memory access key in the bank, the corresponding number is retrieved from memory and automatically dialed. Telephones having such a repertory dialing capacity also include secondary keys such as "PROGRAM" keys, "MEMORY" keys, "SPEED DIAL" keys and the like that are used in conjunction with the dialing keys and the memory access keys to enter new numbers into the number storage memory.

There are also other types of telephones that contain a bank of keys that are used to access multiple call appearances or special features provided by a telephone network. Such keys may be treated as memory access keys for the purpose of storing repertory numbers. Telephones containing such keys may require a preceding press of a dedicated function key, such as a memory key, recall key or shift key, to retrieve and automatically dial information stored in the repertory memory.

Another example of a repertory dialing telephone is one that has only a dialing keypad (keys 0–9,* #) and at least one function key. The function key is considered a program key and might be labeled "PROGRAM" or "STORE". Such telephones may also include other function keys such as a pause key that is used to place a pause into a number sequence. The pause key may have other functions when the telephone is not in a programming state. Another likely, but not specifically necessary key would be a function key used to autodial stored number sequences from the repertory memory. Such function keys are often labeled "MEMORY", "RECALL" or a similar name descriptive of its function. In many telephone systems, such a "MEMORY" key is not required, and if present, its use may be optional. This is because a number sequence stored in a repertory may be autodialed by simply pressing a dial pad key associated with the desired stored repertory number when the telephone is on-hook and therefore not in a phone call. Such an action would drive the telephone into an off-hook state to await a dialtone and autodial the appropriate repertory number. The user would hear the progress of the call through the telephone's speaker or other sounding device. The user could then lift the handset to continue with the call.

Regardless of the type of telephone used, in the prior art a user typically must press the various keys on a telephone in a predetermined programming sequence in order to properly enter a number into the telephone's number storage memory. Any deviation from the proper programming sequence often results in the number not being properly stored. Due to the relatively large number of keys available on the telephone, the proper programming sequence cannot always be guessed or determined by logic. Consequently, the instruction manual that shows the proper programming sequence must be either memorized or maintained for reference.

A need therefore exists in the art for a telephone with a repertory dialing capacity that has a highly flexible programming architecture for controlling the programming of numbers into the number storage memory, wherein a variety of different key sequences can be used to properly enter numbers into the number storage memory. As a result, it would be far more probable that a person trying to guess the proper programming sequence for a telephone would be successful.

SUMMARY OF THE INVENTION

The present invention relates to a telephone having a repertory dialing capacity and the associated methods of programming new number sequences into the repertory dialing memory of the telephone. The telephone includes dialing keys and may include memory access keys or other keys that behave as memory access keys when preceded by a dedicated function key, such as a memory key, a shift key or a recall key. The dialing keys are used to dial the telephone. The memory access keys are used to selectively retrieve stored number sequences from the repertory dialing memory. The function keys are used to switch the telephone between an operational state, wherein the dialing keys are used to dial, and a program state wherein said dialing keys are used to enter number sequences into the repertory dialing memory. A controller contained within the telephone provides access to the repertory dialing memory and enables a new number sequence to be entered into the repertory dialing memory, provided one of a plurality of key event sequences occur. The key event sequences include a key event from a function key to switch the telephone into its program state, the entering of a number sequence and the assignment of the new number sequence to one of the memory access keys, all occurring in one of several orders. By providing a flexible program architecture with a plurality of acceptable sequences, a telephone is provided that has a dialing repertory that can be easily reprogrammed without instruction, through the use of reasoned guesses and/or trial and error.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
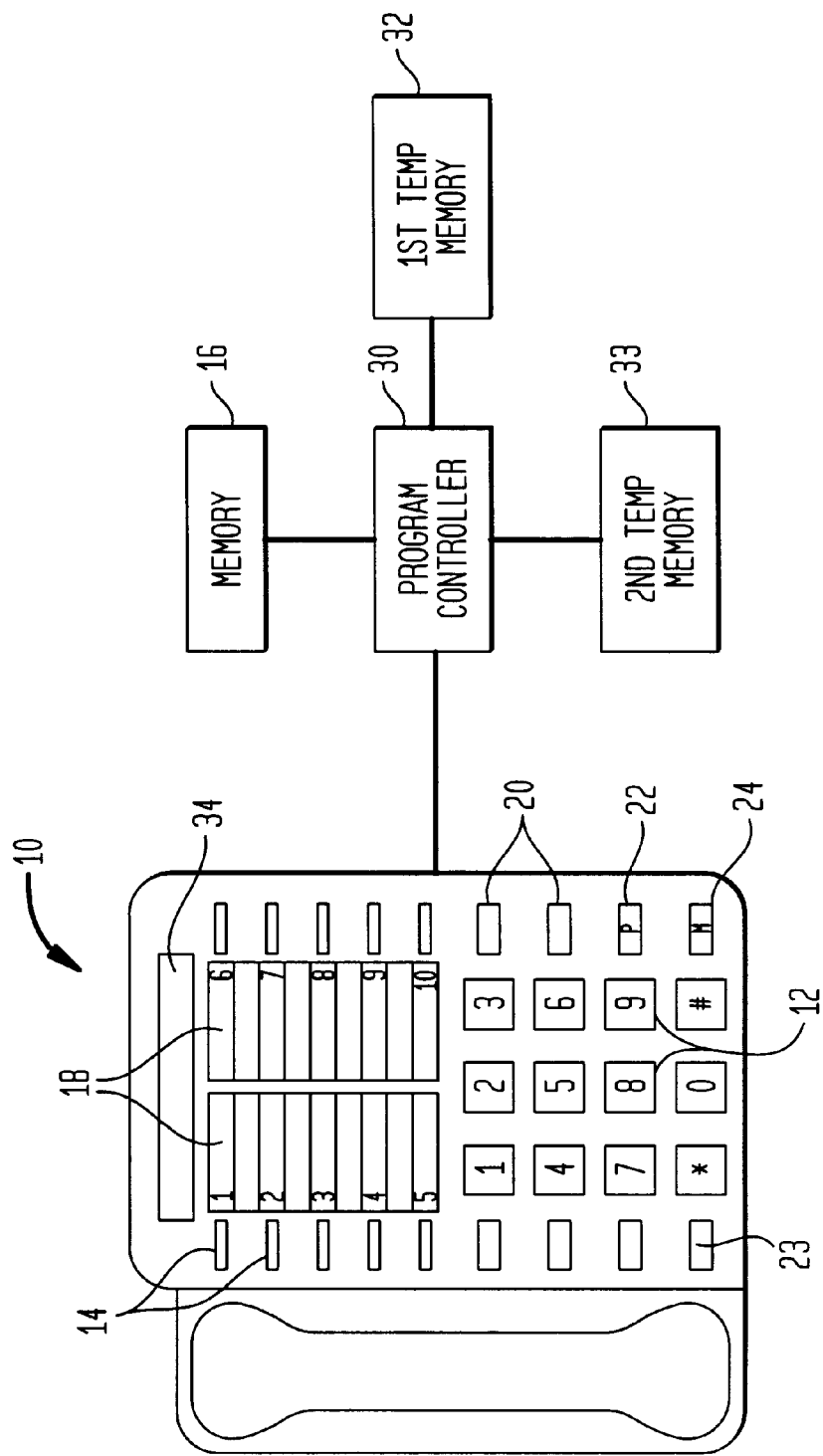
FIG. 1 is a block diagram schematic showing a telephone with a repertory dialing capacity and embodying the present invention programming system and method.

Referring to FIG. 1, a telephone 10 is shown having a repertory dialing capacity. The telephone includes twelve manual dial keys 12 that include a separate key for the numbers zero through nine as well as a pound key and an asterisk key. Above the manual dial keys 12 is a bank of memory access keys 14 that may be used for autodialing telephone numbers or otherwise retrieving number sequences stored in a repertory memory 16. The memory access keys 14 may have other functions, such as access to a multiplicity of telephone lines or call appearances, and may or may not require the pressing of a dedicated function key to retrieve and automatically dial stored repertory numbers. Next to each of the memory access keys 14 is a text space 18 into which text can be written or placed. The text space 18 may be used to identify the corresponding memory access key 14 to a person using the telephone 10. For instance, if one of the memory access keys 14 were programmed to retrieve and dial the number for a person's office, the word "office" may be printed into the text space 18 next to that memory access key.

In the shown embodiment, there are ten memory access keys 14 arranged into two columns of five and numbered one through ten. It will be understood that in different embodiments, any number of memory access keys 14 can be used, wherein those memory access keys are positioned in any one of a number of different arrangements. It should also be understood that certain telephones may not have any dedicated memory access keys but may have keys that act like memory access keys when preceded by a dedicated function key such as a memory key, shift key or recall key. For the purpose of this description all such keys are considered memory access keys.

In addition to the dial keys 12 and the memory access keys 14, the telephone 10 in the shown embodiment includes a number of function keys 20. The function keys 20 are used to control the various operational functions designed into the telephone 10. Among the various function keys 20 in the shown embodiment are a "PROGRAM" key 22, a "PAUSE" key 23 and a "MEMORY" key 24. Such keys are typically found on telephones as exemplified by the Model IDSN-10 telephone manufactured by Lucent Technologies.

When a user presses one of the memory access keys 14, the appropriate number is recalled from memory 16 by the program controller 30, wherein the program controller 30 automatically dials the number recalled. Such a function is apparent to an unfamiliar user of the telephone 10 because of the text spaces 18 that clearly identify the various memory access keys 14. What is not immediately apparent to an unfamiliar user is how a new number sequence is entered into the repertory memory 16 of the telephone 10 and how that new number sequence is assigned to one of the memory access keys 14. By logic and process of elimination, an unfamiliar user may ascertain that programming a new number sequence into the memory may possibly involve the use of some combination of the PROGRAM key 22, the MEMORY key 24, the memory access keys 14 and the dial keys 12. An unfamiliar user would eliminate from consideration other function keys, such as the "HOLD" key, that obviously are not associated with retrieving number sequences from the telephone's memory. However, the sequence of keys to properly reprogram the program controller 30 is not self-evident. As will be explained, the present invention uses a flexible programming architecture wherein most any logical sequence of key events is proper to reprogram the program controller 30 and enter a new number sequence into the repertory memory 16.

Intending to program or reprogram the telephone, it may appear reasonable to an unfamiliar user that either the PROGRAM key 22 or MEMORY key 24 must be depressed first. The conclusion is based upon the fact that if a memory access key 14 were depressed first, a number would be recalled from memory and dialed. Similarly, if a manual dial key 12 were depressed first, a number would begin to be dialed as though the person were just dialing a number in the normal fashion. In the shown embodiment, the telephone 10 has an LCD display 34 that displays a number being dialed. By way of example, it is preferred that the PROGRAM key 22 be depressed first if a person wants to program a new number sequence into the autodialing repertory. As such, if a person presses the MEMORY key 24 as the first key then presses any single key from the dial keys 12 or the memory access keys 14, a repertory number sequence will be retrieved from the memory 30. However, pressing any key other than a dial key 12 or a memory access key 14 may produce an error informing the user that an improper key has been selected. If a telephone does not have a display, an audible tone may be played informing a person that the entered key sequence was improper. In an alternate embodiment, the opposite sequence can be preferred wherein the MEMORY key 24 is the proper first key event needed to begin the sequence to store a number sequence into the repertory memory 16. However, for the examples and description to follow, it is to be assumed that the PROGRAM key 22 has been selected as the proper first key event to save a number sequence.

Having limited an unfamiliar user's options, it can be assumed that a person trying to program the telephone 10 will eventually press the PROGRAM key 22 to begin the number programming sequence. However, a large variety of subsequent key combinations are still possible using combinations of the PROGRAM key 22, the MEMORY key 24, the memory access keys 14 and the manual dial keys 12.

Figure 2A:
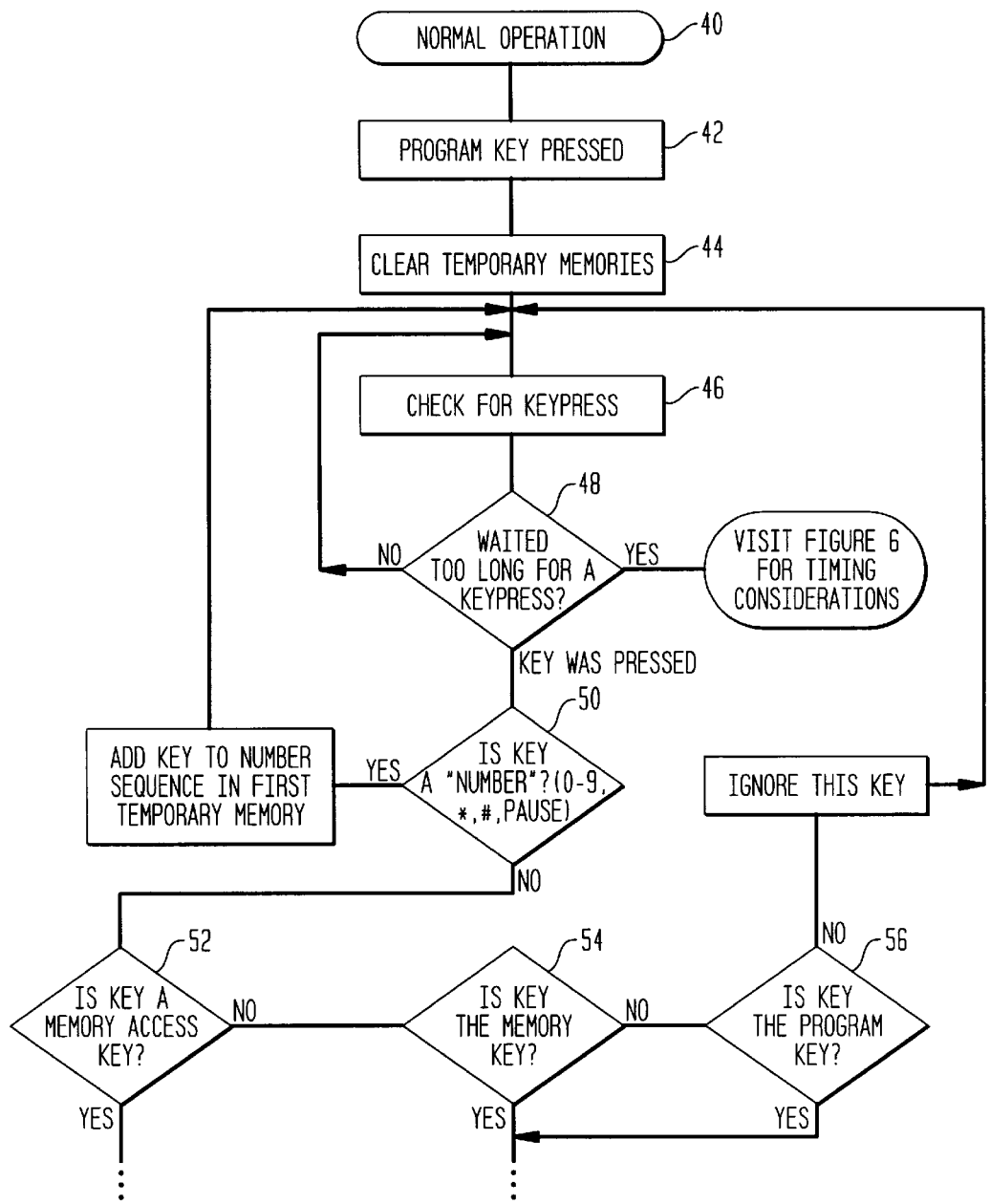
FIG. 2 is a block flow diagram depicting the overall logic flow of the method of operation for the present invention.
Figure 2B:
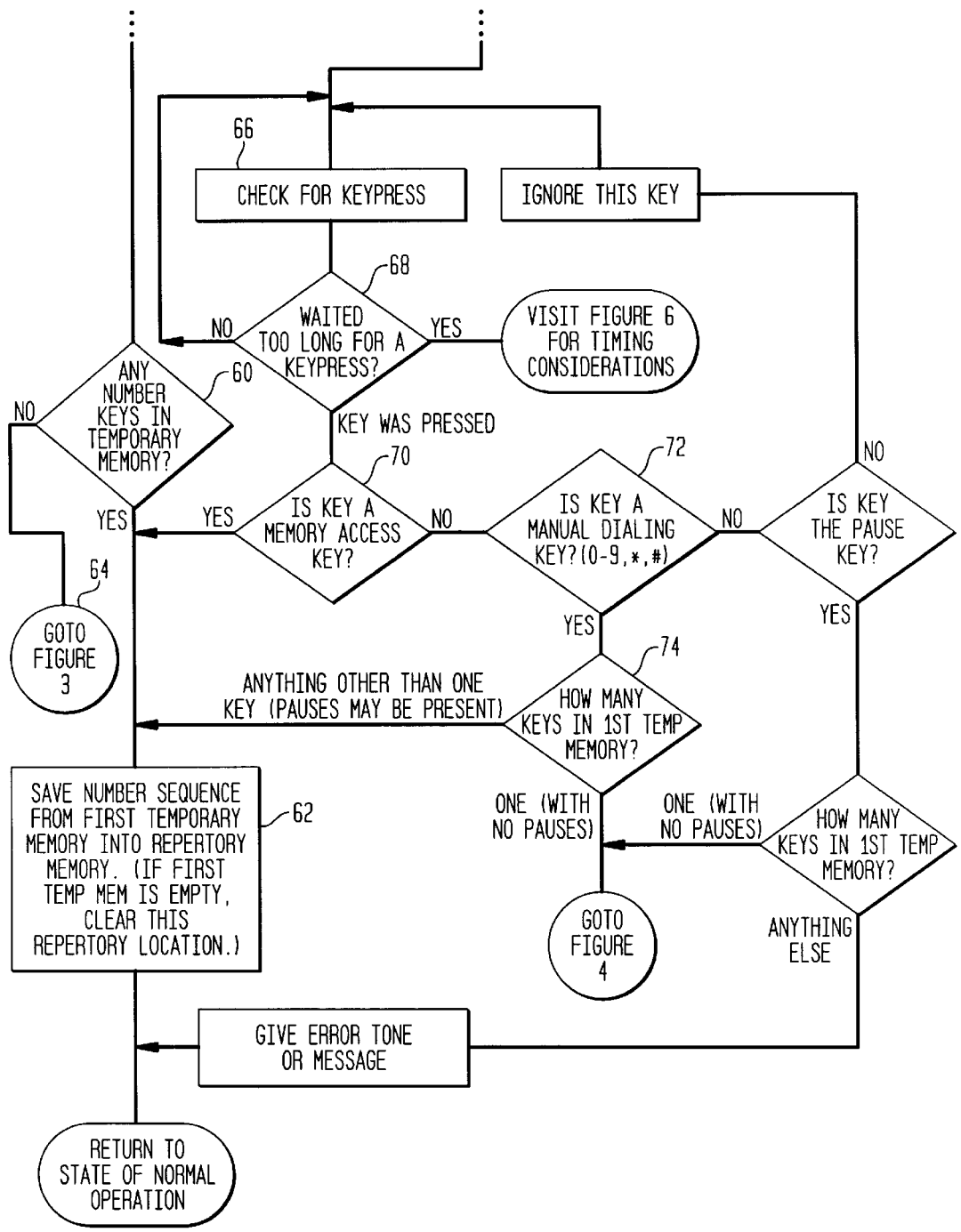

Referring to FIG. 2, there is shown a flow diagram of one proper programming sequence for the program controller 30 (FIG. 1). In the flow diagram of FIG. 2, it is assumed that an unfamiliar user first depresses the PROGRAM key 22 and then decides to directly enter a new number sequence that the user wants stored in memory. A number sequence may include the numbers 0–9, *, # and pause, where pause is entered by pressing the PAUSE key 23 (FIG. 1) on the telephone. After having entered the new number sequence, an unfamiliar user then must direct the program controller 30 (FIG. 1) to save the new number sequence and assign the new number sequence to one of the memory access keys 14 (FIG. 1) or to one of the dial keys 12. Given the logical chain of events, an unfamiliar user may guess at one of the key sequences set forth below in Table I.

TABLE I

|     | 1st key     | 2nd key         | 3rd key        | 4th key         |
| --- | ----------- | --------------- | -------------- | --------------- |
| 1)  | PROGRAM Key | Number Sequence | Mem Access Key | —               |
| 2)  | PROGRAM Key | Number Sequence | MEMORY Key     | Mem Access Key  |
| 3)  | PROGRAM Key | Number Sequence | MEMORY Key     | Manual Dial Key |
| 4)  | PROGRAM Key | Number Sequence | PROGRAM Key    | Mem Access Key  |
| 5)  | PROGRAM Key | Number Sequence | PROGRAM Key    | Manual Dial Key |

All of the above combinations are proper to reprogram the program controller 30 (FIG. 1) and enter a new number sequence into the telephone's repertory memory 16 (FIG. 1). As is shown in FIG. 2 by block 40, a telephone is assumed to begin in a normal operational state. As a user presses the PROGRAM key 22 (FIG. 1) all temporary memories 32, 33 (FIG. 1) in the telephone are cleared, as indicated by block 42 and block 44, respectively. After the PROGRAM key 22 (FIG. 1) is pressed, a timing consideration subroutine is executed to determine whether the user is attempting to program the telephone or if the PROGRAM key 22 (FIG. 1) was pressed in error. The timing consideration subroutine is represented by block 46 and 48, respectively. The logic diagram of the timing consideration subroutine is shown in regard to FIG. 6 and will later be explained.

As indicated by block 50, block 52, block 54 and block 56, respectively, if a key is properly pressed within the allotted time constraints, the system determines if the pressed key was a dial key 12 (FIG. 1), a memory access key 14 (FIG. 1), a MEMORY key 24 (FIG. 1) or a PROGRAM key 22. As shown by block 50, if the first pressed key event is a dialing key 12, then the key is entered into a first temporary memory 32 (FIG. 1), thereby beginning a number sequence. The number sequence in the first temporary memory 32 (FIG. 1) is added to with subsequent key events until a memory access key 14 (FIG. 1), MEMORY key 24 (FIG. 1) or PROGRAM key 22 (FIG. 1) is pressed.

From block 52, block 60 and block 62 it can be seen that if the memory access key 24 (FIG. 1) is pressed after a certain sized number sequence has been stored in the first temporary memory 32 (FIG. 1), then the number sequence is saved into the repertory memory 16 (FIG. 1) from the first temporary memory 32 (FIG. 1). The number sequence in the repertory memory 16 (FIG. 1) is addressed by the memory access key 24 (FIG. 1) last pressed. As such, to retrieve that number sequence, the user need only press that memory access key. This sequence of key events. i.e. PROGRAM key, number sequence, memory access key represents the first line option expressed in Table I.

The second and third line options expressed by Table I show a scenario where a MEMORY Key 24 (FIG. 1) is pressed after the PROGRAM key 22 (FIG. 1) and after a number sequence has been entered. Referring to FIG. 2, such a scenario is represented in the flow diagram at block 54 and the dependent blocks that extend below block 54. After the MEMORY key 24 (FIG. 1) is pressed, the system waits for another key to be pressed within certain time constraints. As such, the system executes a timing consideration subroutine. The timing consideration subroutine is represented by block 66 and 68, respectively. The logic diagram of the timing consideration subroutine is shown in regard to FIG. 6 and will later be explained.

If a key is pressed within the allotted time window, the system then evaluates what type of key has been pressed. As is indicated by block 70, if the next key pressed is a memory access key 14 (FIG. 1) then the number sequence is read into the repertory memory 16 (FIG. 1) from the first temporary memory 32 (FIG. 1) and the number sequence in the repertory memory 16 is addressed by the memory access key 12 (FIG. 1) last pressed. As such, to retrieve that number sequence, the user need only press that memory access key. This sequence of a memory access key being pressed after a MEMORY key corresponds to the sequence of line 2 in Table I.

In the third option of Table I, at least one dial key is pressed after the MEMORY key. As is indicated by block 72, if a dial key 12 (FIG. 1) is pressed after the MEMORY key 24 (FIG. 1), then the system evaluates how many dial keys 12 are being held in the first temporary memory 32 (FIG. 1). As indicated by block 74, if more than one dial key 12 (FIG. 1) is stored in the first temporary memory 32 (FIG. 1), then the number sequence dialed prior to the pressing of the MEMORY key 24 (FIG. 1) is entered into the repertory memory 16 (FIG. 1) from the first temporary memory (FIG. 1). The dial keys 12 (FIG. 1) pressed after the MEMORY key 24 (FIG. 1) are then used to address the number sequence in the repertory memory 16 (FIG. 1).

Figure 4:
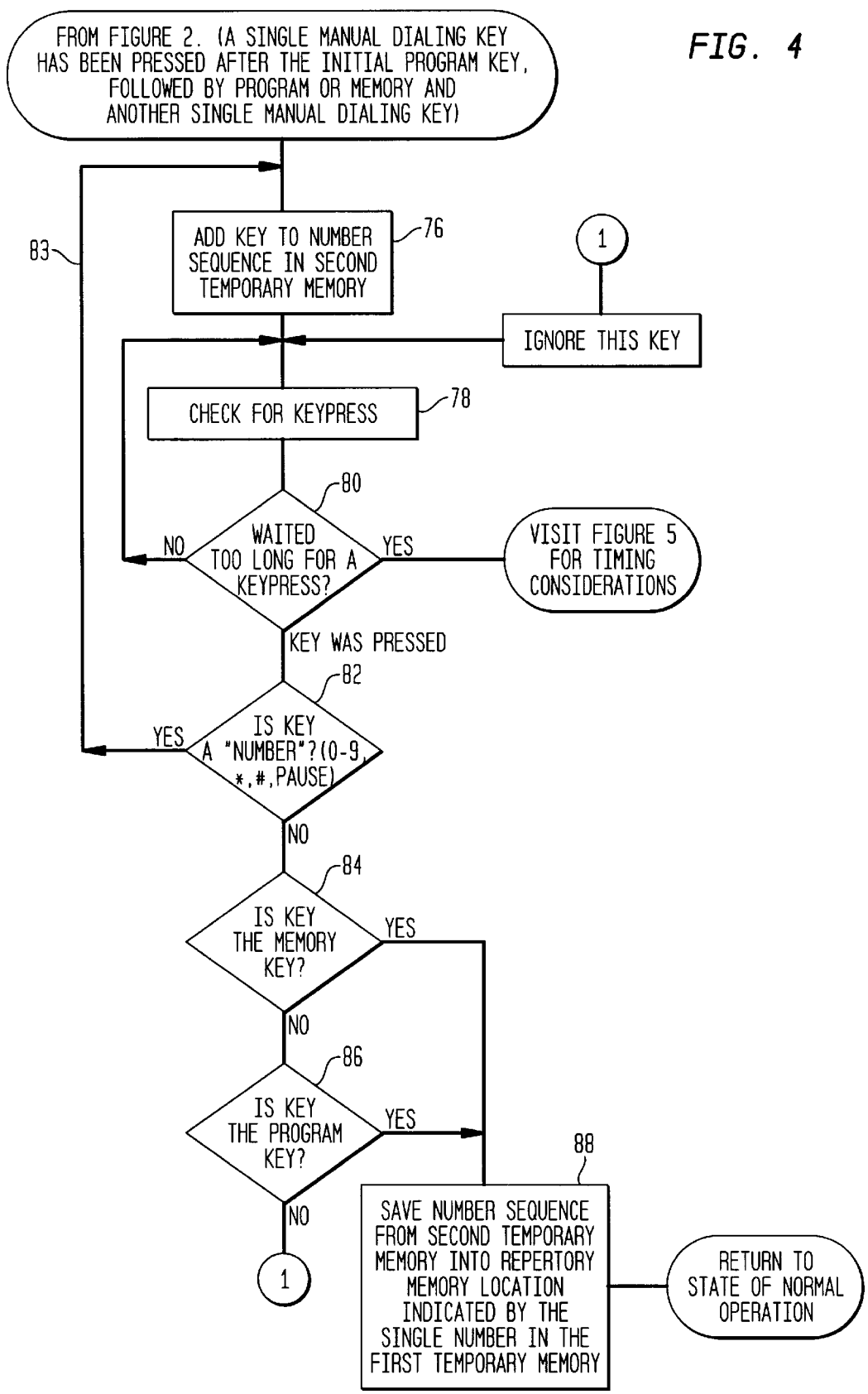
FIG. 4 is a block flow diagram of a second subroutine that is executed if a second grouping of acceptable programming sequences are entered into a telephone by a user.

Another sequence option for an unfamiliar user is to press one of the manual dial keys 12 (FIG. 1) after initially pressing the PROGRAM key 22 (FIG. 1). A user may reason that by pressing a manual dial key 12 (FIG. 1) after the PROGRAM key 22 (FIG. 1), the user is identifying which of the repertory memory locations associated with a manual dialing key 12 (FIG. 1) he/she wants to reprogram. For example, if a user presses the PROGRAM key 22 (FIG. 1) and then the number two manual dial key, it can be assumed that the user may be attempting to program the repertory memory location associated with the 2 key on the dial pad. Should an unfamiliar user select a manual dial key 12 (FIG. 1) immediately after the PROGRAM key 22 (FIG. 1), then typically only one dial key would be initially pressed. If only one dial key 12 is stored in the first temporary memory 32 (FIG. 1) prior to the pressing of the MEMORY key 24 (FIG. 1) then the system executes the subroutine shown in FIG. 4. Referring to FIG. 4, it can be seen by block 76 that any key pressed after the execution of the subroutine is stored in a second temporary memory 33 (FIG. 1). The time passed in between key events is monitored. As such, the system executes a timing consideration sub-subroutine. The timing consideration sub-subroutine is represented by block 78 and block 80, respectively. The logic diagram of the timing consideration sub-subroutine is shown in regard to FIG. 5 and will later be explained.

If a key is pressed within the allotted time window, the system then evaluates what type of key has been pressed. As is indicated by block 82, if the next key pressed is a dial key 12 (FIG. 1) then that key is also added to the second temporary memory 33 (FIG. 1) as is indicated by loop line 83. As such, a number sequence is created in the second temporary memory 33 (FIG. 1). Conversely, if the next key pressed is not a dial key 12 but rather is a MEMORY key or a PROGRAM key, then the number sequence held in the second temporary memory 33 (FIG. 1) is read into the repertory memory 16 (FIG. 1) and the number originally entered into the first temporary memory 32 (FIG. 1) is number sequence stored in the second temporary memory 33 (FIG. 1) when read into the repertory memory 16 (FIG. 1). Such a scenario is shown by block 84, block 86 and block 88 in FIG. 4.

The fourth and fifth option set forth in Table I show a scenario where a PROGRAM key 22 (FIG. 1) is pressed first, a number sequence is entered using the dial keys 12 (FIG. 1) and a PROGRAM key 22 is again pressed. Such a scenario is represented in the logic flow of FIG. 2 at block 56. Referring to FIG. 2, it can be seen that after the PROGRAM key 22 (FIG. 1) is pressed for the second time, the system waits for another key to be pressed within certain time constraints. As such, the system executes a timing consideration subroutine. The timing consideration subroutine is represented by block 66 and 68, respectively. The logic diagram of the timing consideration subroutine is shown in regard to FIG. 6 and will later be explained.

If a key is pressed within the allotted time window, the system then evaluates what type of key has been pressed. As is indicated by block 70, if the next key pressed is a memory access key 14 (FIG. 1) then the number sequence is read into the repertory memory 16 (FIG. 1) from the first temporary memory 32 (FIG. 1) and the number sequence in the repertory memory 16 is addressed by the memory access key 24 last pressed. As such, to retrieve that number sequence, the user need only press that memory access key. This sequence of a memory access key being pressed after a MEMORY key corresponds to the fourth option in Table I.

In the fifth option of Table I, at least one dial key is pressed after the MEMORY key. As is indicated by block 72, if a dial key 12 (FIG. 1) is pressed after the PROGRAM key 22 (FIG. 1), then the system evaluates how many dial keys 12 are being held in the first temporary memory 32 (FIG. 1). As indicated by block 74, if more than one dial key 12 is stored in the first temporary memory 32 (FIG. 1), then the number sequence dialed prior to the pressing of the MEMORY key 24 (FIG. 1) is entered into the repertory memory 16 (FIG. 1) from the first temporary memory 32 (FIG. 1). The dial key 12 (FIG. 1) pressed after the PROGRAM key 22 (FIG. 1) are then used to address the number sequence in the repertory memory 16 (FIG. 1).

If only one dial key 12 is stored in the first temporary memory 32 (FIG. 1) prior to the second pressing of the PROGRAM key 22 (FIG. 1) then the system executes the subroutine shown in FIG. 4. The subroutine of FIG. 4 has previously been explained, wherein the subroutine assigns the number sequence entered either before or after the second pressing of the PROGRAM key 22 into the repertory memory depending upon certain described parameters.

Table I lacks the example where both the MEMORY key 24 (FIG. 1) and the PROGRAM key 22 (FIG. 1) are depressed in some order after the selection of the new number sequence. In such a scenario, the subsequent depression of either the MEMORY key 24 (FIG. 1) or the PROGRAM key 22 (FIG. 1) would be ignored. As such, it should be understood from FIG. 2 and Table I, that once the PROGRAM key 22 (FIG. 1) is depressed and the new number sequence entered, any function key combination can then be entered without effect until either a memory access key 14 (FIG. 1) or a manual dial key 12 (FIG. 1) is depressed. The first memory access key 14 (FIG. 1) or manual dial key 12 depressed then determines which of the memory access keys will be assigned to the new number sequence. As has previously been explained, an unfamiliar user is limited in his/her options and eventually will depress the PROGRAM key 22 (FIG. 1) to begin the reprogramming of the program controller 30 (FIG. 1). The second key event, however, is a variable. Should an unfamiliar user select the memory access key 14 (FIG. 1) to be depressed immediately after the PROGRAM key 22 (FIG. 1) then the key sequences set forth below in Table II are possible.

TABLE II

| | 1st Key | 2nd Key | 3rd Key | 4th Key | 5th Key |
|---|---|---|---|---|---|
| 1) | PROGRAM Key | Mem Access Key | Num Sequence | PROGRAM Key | — |
| 2) | PROGRAM Key | Mem Access Key | Num Sequence | MEMORY Key | — |
| 3) | PROGRAM Key | Mem Access Key | Num Sequence | Same Mem Access Key | |
| 4) | PROGRAM Key | Mem Access Key | PROGRAM Key | Num Sequence | PROGRAM Key |
| 5) | PROGRAM Key | Mem Access Key | PROGRAM Key | Num Sequence | MEMORY Key |
| 6) | PROGRAM Key | Mem Access Key | PROGRAM Key | Num Sequence | Same Mem Access Key |
| 7) | PROGRAM Key | Mem Access Key | MEMORY Key | Num Sequence | PROGRAM Key |
| 8) | PROGRAM Key | Mem Access Key | MEMORY Key | Num Sequence | MEMORY Key |
| 9) | PROGRAM Key | Mem Access Key | MEMORY Key | Num Sequence | Same Mem Access Key |

Figure 3A:
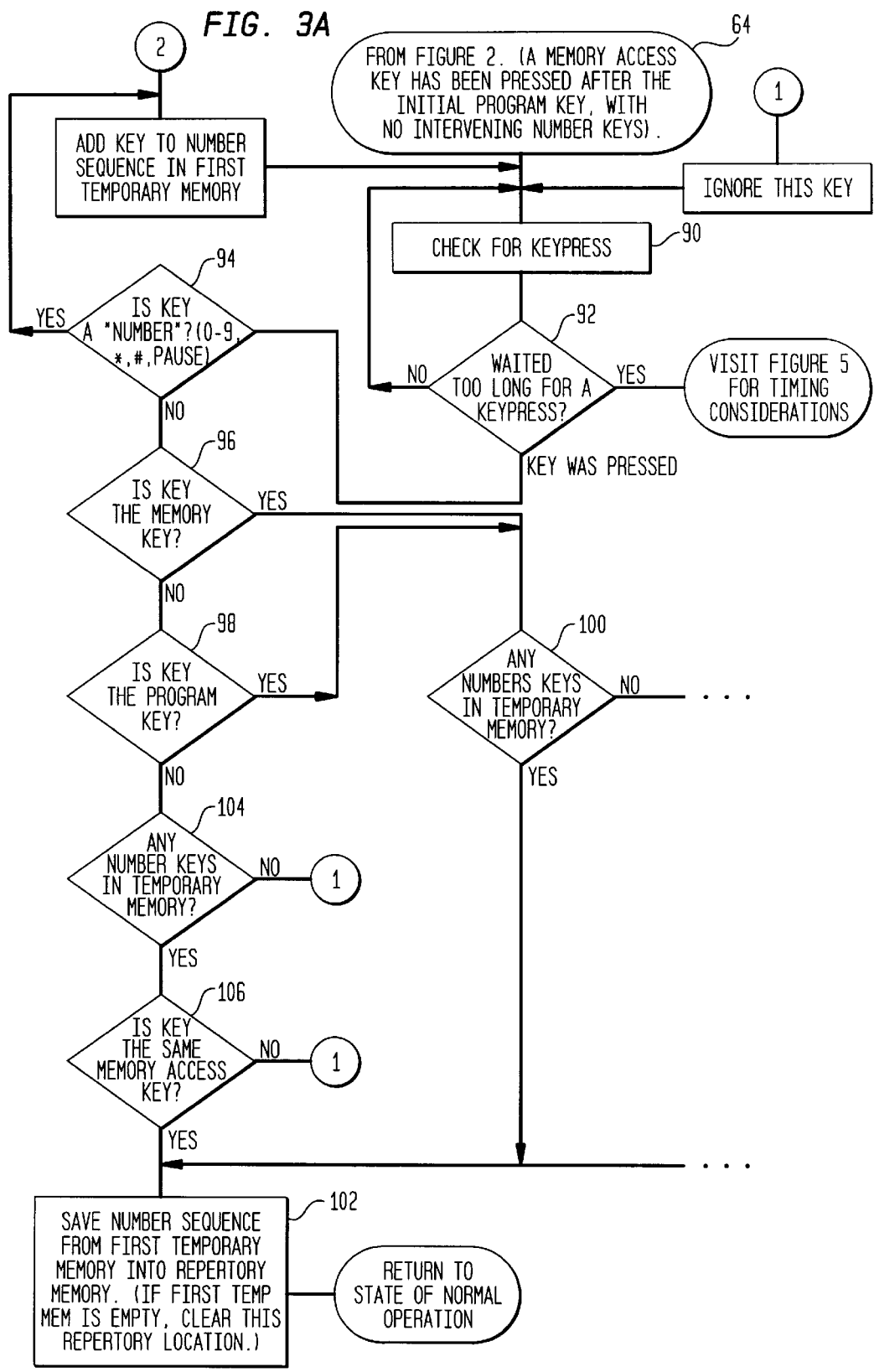
FIG. 3 is a block flow diagram of a first subroutine that is executed if a first grouping of acceptable programming sequences are entered into a telephone by a user.
Figure 3B:
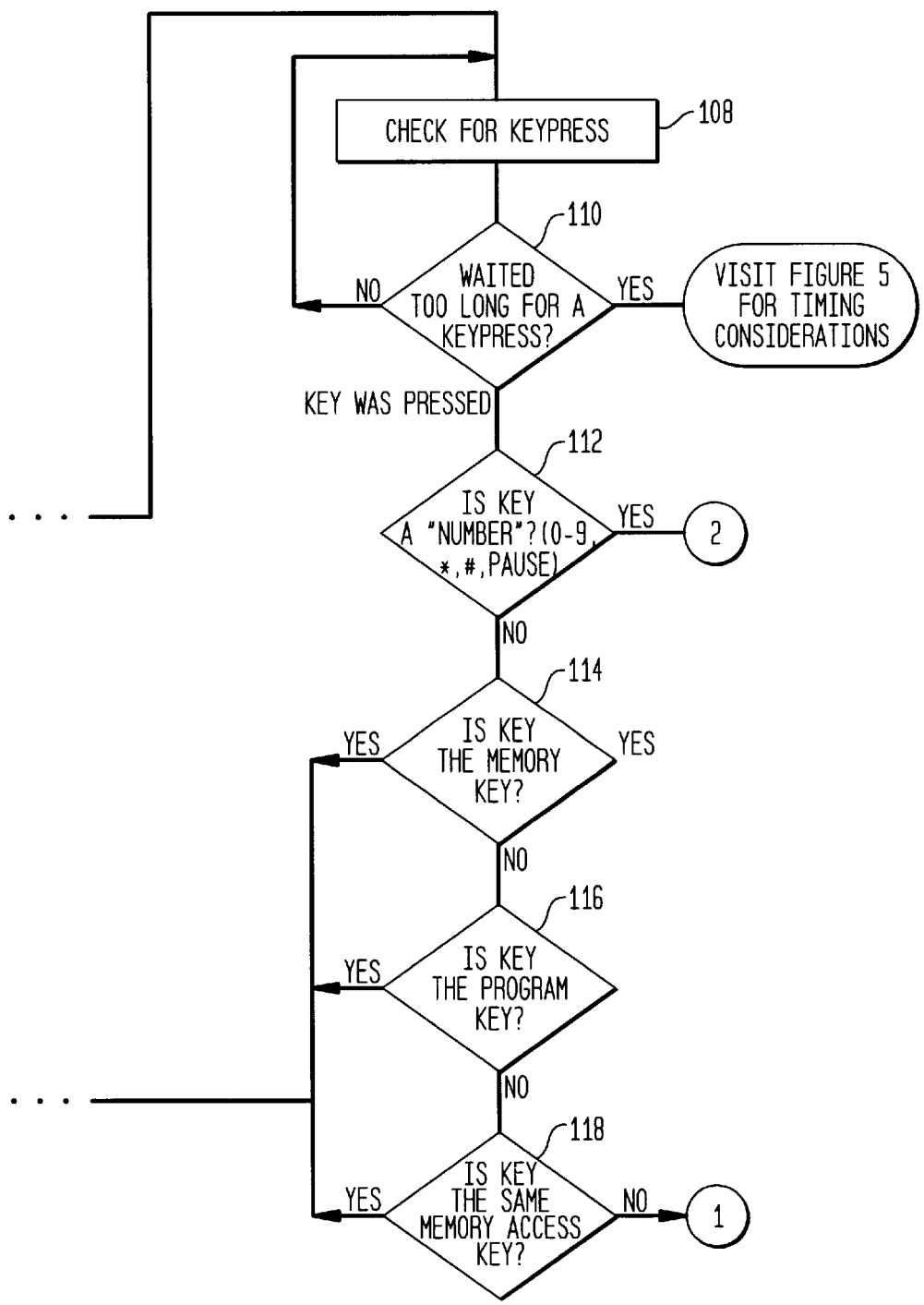

All of the above combinations are proper to reprogram the program controller 30 (FIG. 1) and enter the new number sequence into the autodial repertory. Referring to FIG. 2, it can be seen that if no dial keys 12 (FIG. 1) are pressed after the initial pressing of the PROGRAM key 22 (FIG. 1) and prior to the pressing of the memory access key 14 (FIG. 1) then the subroutine of FIG. 3 is executed as is indicated by subroutine circle 64 in FIG. 2. Referring to FIG. 3, it can be seen that once the subroutine is executed, the time passed in between key events is monitored. As such, the system executes a timing consideration sub-subroutine. The timing consideration sub-subroutine is represented by block 90 and 92, respectively. The logic diagram of the timing consideration sub-subroutine is shown in regard to FIG. 5 and will later be explained.

As can be seen from block 94, if a dial key 12 (FIG. 1) is entered in the proper period of time then that key is stored in the first temporary memory 32 (FIG. 1) of the system. This is continued until either a MEMORY key 24 (FIG. 1) or a PROGRAM key 22 (FIG. 1) is pressed, as represented by block 96 and block 98, respectively. Such scenarios are also represented by the first and second option choices in Table II. After either the MEMORY key 24 (FIG. 1) is pressed or the PROGRAM key 22 (FIG. 1) is pressed, the system checks to see if any number sequence is stored in the first temporary memory 32 (FIG. 1), as indicated by block 100. If a number sequence is present in the first temporary memory 32 (FIG. 1) then that number sequence is entered into the repertory memory 16 (see block 102) and that number sequence is addressed with the memory access key that was initially pressed prior to the execution of the subroutine of FIG. 3.

In Table II, the third option sequence has a PROGRAM key 22 (FIG. 1) being depressed, a memory access key 14 (FIG. 1) being depressed, a number sequence entered and the same memory access key being again depressed. Looking to block 104 and block 106 in the subroutine of FIG. 3, it can be seen that if the same memory access key is pressed after entering the number sequence, then that number sequence is read to the repertory memory 16 (FIG. 1) and is addressed by that memory access key.

The fourth through ninth options of Table II all include five key stroke sequences. All sequences begin with the pressing of a PROGRAM key 22 (FIG. 1) and a memory access key 14 (FIG. 1). The pressing of the memory access key 14 (FIG. 1) is then followed with either a second pressing of the PROGRAM key 22 (FIG. 1) or a first pressing of a MEMORY key 24 (FIG. 1). A number sequence is then entered and the key events end with the final pressing of the PROGRAM key 22 (FIG. 1), MEMORY key 24 (FIG. 1) or the same memory access key 14 (FIG. 1)as was pressed immediately following the first PROGRAM key.

Referring to block 96 and block 98 of FIG. 3, it can be seen that if a MEMORY key 24 (FIG. 1) or a PROGRAM key 22 (FIG. 1) is pressed after a memory access key 14 (FIG. 1) the system checks to see if any number sequence has been entered. If no number sequence has yet been entered then the system executes a timing consideration sub-subroutine. The timing consideration sub-subroutine is represented by block 108 and block 110, respectively. The logic diagram of the timing consideration sub-subroutine is shown in regard to FIG. 5 and will later be explained.

As can be seen from block 112, if a dial key 12 (FIG. 1) is entered in the proper period of time, then that key is stored in the first temporary memory 32 (FIG. 1) of the system. After a number sequence is entered into the first temporary memory 32 (FIG. 1), if a MEMORY key 24, PROGRAM key 22 or the same memory access key 14 is then pressed, the number sequence is read from the first temporary memory 32 (FIG. 1) into the repertory memory 16 (FIG. 1). This is shown by block 114, block 116 or block 118. The number sequence is then addressed with the memory access key that was entered as the second key in the overall key event string.

In addition to the key sequences previously shown in Table I and Table II, pauses during programming can also be used as a variable in the programming sequence. For example, consider Table III listed below.

TABLE III

| | 1st Key | 2nd Key | 3rd Key | 4th Key | Pause period |
|---|---|---|---|---|---|
| 1) | PROGRAM Key | Mem access Key | New number | — | X |
| 2) | PROGRAM Key | Mem access Key | PROGRAM Key | New number | X |
| 3) | PROGRAM Key | Mem access Key | MEMORY Key | New number | X |
| 4) | PROGRAM Key | Manual dial Key | PROGRAM Key | New number | X |
| 5) | PROGRAM Key | Manual dial Key | MEMORY Key | New number | X |

All of the above combinations are proper to reprogram the program controller 30 (FIG. 1) and enter the new number sequence into the autodial repertory. The long pause at the end of the program sequence indicates to the program controller 30 (FIG. 1) that the number sequence immediately prior to the long pause is to be stored in memory.

After the initial PROGRAM key 22 (FIG. 1) is depressed and either a memory access key 14 (FIG. 1) or a manual dial key 12 (FIG. 1) is depressed, an unfamiliar user is presented with three options. Those options are to directly enter the new number sequence, press the PROGRAM key 22 (FIG. 1), or press the MEMORY key 24 (FIG. 1). If the user selects to directly enter the new number sequence, then that new number sequence will be entered into memory provided no other key events occur within a predetermined pause period. If no other key events occur within the predetermined pause period, subsequent key events are ignored and the new number sequence is stored and assigned to the appropriate memory access key 14 (FIG. 1)

A user may select to press the PROGRAM key 22 (FIG. 1) or the MEMORY key 24 (FIG. 1) prior to entering the new number sequence. Such a key sequence is proper and the new number sequence will be entered provided no other key events occur within a predetermined pause period after the new number sequence is entered.

New numbers can also be entered by depressing the manual dial keys 12 (FIG. 1) in a certain sequence. However, as is shown by Tables I–III, individual manual dial keys 12 (FIG. 1) are often used as variables during the programming sequence. A problem therefore exists, wherein the program controller 30 (FIG. 1) must determine if a keystroke from a manual dial key 12 (FIG. 1) is a programming variable or is part of the new number sequence being entered. To solve this problem, the program controller 30 (FIG. 1) is capable of recognizing pauses between manual dial keystrokes to determine if each keystroke is an individual variable or part of a larger sequence. For example, consider Table IV listed below.

TABLE IV

| | 1st Key | 2nd Key | Short Pause | 3rd Key | 4th Key | Long Pause |
|---|---|---|---|---|---|---|
| 1) | PROGRAM Key | Manual dial Key | X | New number | — | X |
| 2) | PROGRAM Key | New number | X | Manual dial Key | — | X |
| 3) | PROGRAM Key | Manual dial Key | X | New number | PROGRAM Key | X |
| 4) | PROGRAM Key | Manual dial Key | X | New number | MEMORY Key | X |
| 5) | PROGRAM Key | New number | X | Manual dial Key | PROGRAM Key | X |
| 6) | PROGRAM Key | New number | X | Manual dial Key | MEMORY Key | X |

In each of the options shown in Table V, a single manual dial key keystroke is made either directly before or directly after a new number sequence is entered.

Figure 5:
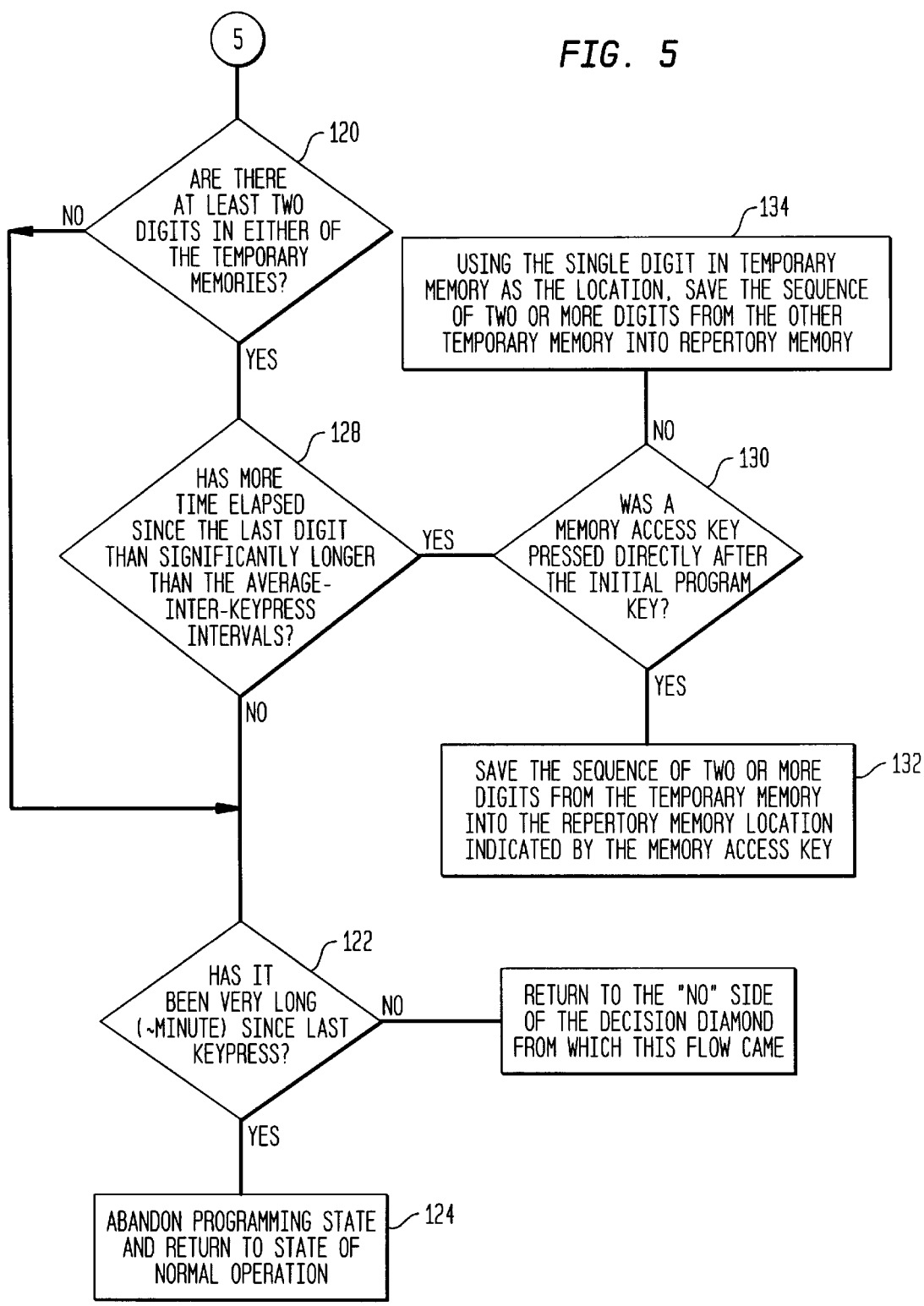
FIG. 5 is a block flow diagram depicting a first time consideration subroutine used during a preferred method of operation of the present invention.
Figure 6:
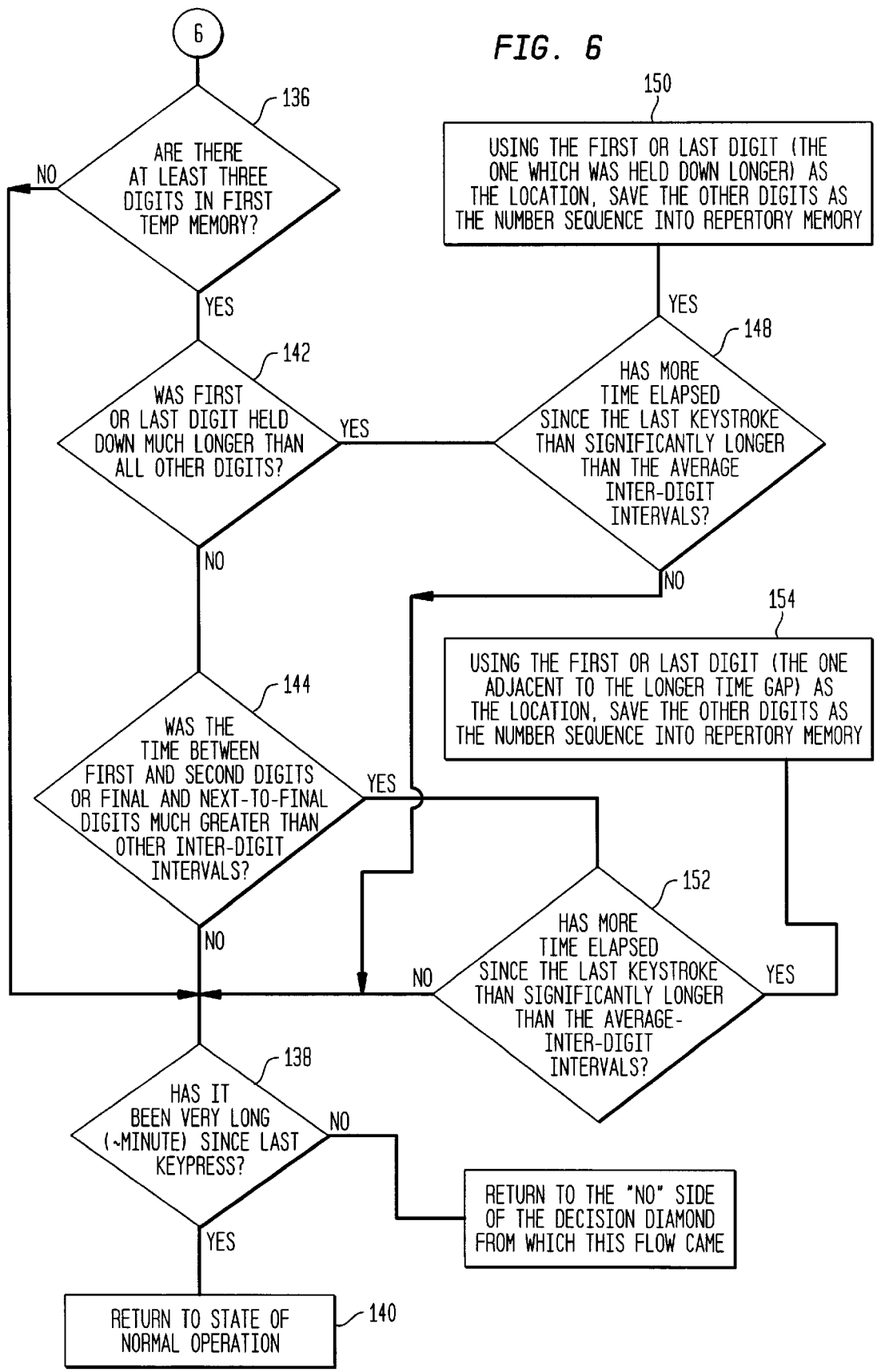
FIG. 6 is a block flow diagram depicting a second time consideration subroutine used during a preferred method of operation of the present invention.

The recognition of pauses is determined by the time consideration subroutines represented by FIG. 5 and FIG. 6. Referring first to FIG. 5, from block 120 it can be seen that the subroutine first determines if there are at least two numbers stored in the first temporary memory 32 (FIG. 1) of the system. If two numbers are not present, the system measures how long it h as been since a key event has occurred. This is shown by block 122. If the elapsed time surpasses a predetermined threshold, it is assumed that a user is not trying to program the telephone and the telephone system is returned to its normal state of operation, as indicated by block 124.

If there are at least two numbers stored in the first temporary memory 32 (FIG. 1), then the subroutine determines the elapsed time between key events. If more time has elapsed since the last key event than was the average between key events, then the system checks to determine whether a memory access key 14 (FIG. 1) was pressed directly after the initial pressing of the PROGRAM key 22 (FIG. 1). This sequence is shown by block 128 and block 130, respectively. As indicated by block 132, if a memory access key 14 (FIG. 1) was pressed after the initial PROGRAM key 22 (FIG. 1), then the number sequence in the first temporary memory 32 (FIG. 1) is read into the repertory memory 16 (FIG. 1) and that number sequence is addressed by the memory access key 12 (FIG. 1) that was pressed.

As indicated by block 134, if a memory access key 14 (FIG. 1) was not pressed after the initial PROGRAM key 22 (FIG. 1) then the number in the first temporary memory 32 (FIG. 1) that is isolated by pauses is used as an address to the remaining numbers, and the remaining numbers are read into the repertory memory 16 (FIG. 1).

In the time consideration program represented by FIG. 6, the number of dial key events held in the first temporary memory 32 (FIG. 1) are also analyzed. Referring to block 136 in FIG. 6, it can be seen that the subroutine first determines whether or not at least three numbers are held in the first temporary memory 32 (FIG. 1). If three numbers are not present, the system measures how long it has been since a key event has occurred. This is shown by block 138. If the elapsed time surpasses a predetermined threshold, it is assumed that a user is not trying to program the telephone and the telephone system is returned to its normal state of operation, as indicated by block 140.

If there are at least three numbers stored in the first temporary memory 32 (FIG. 1), then the subroutine determines if either the first dial key or the last dial key was held down longer than the other dial key events that produced the numbers in the first temporary memory 32 (FIG. 1). This is indicated by block 142. If neither the first nor the last dial key event was abnormally long, then the subroutine determines if the time period between the first and second dial key event or the last and next-to-last dial key event is significantly longer than the time intervals between the other dial key events. This is indicated by block 144. If no significant time differential can be measured, then the subroutine is not capable of determining whether the first or last entered number is intended not to be part of the saved number sequence. After a predetermined period of no key events, the telephone is returned to its normal state of operation.

Referring to block 148, it can be seen that if the subroutine determines that the last or first dial key event is abnormally long then the dial key event is differentiated from the remaining numbers in the first temporary memory 32 (FIG. 1). That isolated number is then used to address the remaining number sequence once that number sequence is read into the repertory memory 16 (FIG. 1). This is indicated by block 150.

Referring to block 152, it can be seen that if the subroutine determines that the last or first dial key event is spaced abnormally long as compared to the dial key events, then that first or last dial key event is differentiated from the remaining numbers in the first temporary memory 32 (FIG. 1). That isolated number is then used to address the remaining number sequence once that number sequence is read into the repertory memory 16 (FIG. 1). This is indicated by block 154.

Once it is determined that either the first or the last manual dial key event is a variable and is not part of the new number sequence being entered, then the new number sequence being entered is assigned to the dialing keypad key 12 (FIG. 1) as a stored repertory memory associated with that dial key.

The program combinations set forth in Tables I–IV are merely exemplary and are not intended to be considered exhaustive of all key event sequences that may work in reprogramming the autodial repertory system of a telephone. Rather, Tables I–IV represent some of the most likely reasoned guesses that may be attempted by a person trying to reprogram the autodial repertory of a telephone without instructions. Furthermore, it will be understood that the use of a telephone with ten memory access keys, a PROGRAM key and a MEMORY key is also merely exemplary. Many different telephones have autodial repertories. Some telephones have memory access keys, a PROGRAM key and a MEMORY key, however, many do not. Rather, some brands of telephones use keys marked "RECALL", "SPEED DIAL" or the like. As such, it will be understood that the names of keys and the number of keys can be changed. All such alternate embodiments and modifications are intended to be included within the scope of the present invention as defined by the appended claims.

What is claimed is:

1. A telephone, comprising:
  a dialing keypad containing a plurality of dialing keys;
  a memory for storing at least one number sequence at an address within said memory;
  a controller for selectively changing said telephone between an operational state, wherein said dialing keys are used to dial, and a program state wherein said dialing keys are used to enter said at least one number sequence into said memory; and a first function key for selectively directing said controller to change said telephone between said operational state and said program state a plurality of keys other than said first function key and said dialing keys, for use in identifying a predetermined address in said memory when used in one of a number of alternate key sequences;

wherein a number sequence is saved at a predetermined address in said memory when said first function key is used to change said controller into said program state, said dial keys are used to enter said number sequence and one of said number of alternate key sequences is used to identify said predetermined address in said memory either before or after said number sequence is entered, thereby providing a plurality of acceptable key event sequences that can be used to enter said number sequence into said memory.

2. The telephone according to claim 1, wherein said plurality of other keys include at least one memory access key.

3. The telephone according to claim 2, wherein said at least one memory access key is included in at least some of said alternate key sequences, wherein said controller assigns said number sequence to the predetermined memory address in said memory identified by the memory access key included within the key sequence selected.

4. The telephone according to claim 3, wherein said plurality of acceptable key event sequences includes a sequence of said first function key, a number sequence entered via said dialing keys, and said at least one memory access key.

5. The telephone according to claim 3, wherein said plurality of acceptable key event sequences includes a sequence of said first function key, a memory access key, and a number sequence entered via said dialing keys.

6. The telephone according to claim 5, wherein said plurality of acceptable key event sequences includes a sequence of said first function key, said at least one memory access key, a number sequence entered via said dialing keys, and one of said plurality of other keys.

7. The telephone according to claim 3, wherein said plurality of acceptable key event sequences includes a sequence of said first function key, said at least one memory access key, one of said plurality of other keys, a number sequence entered via said dialing keys, and another of said plurality of other keys.

8. The telephone according to claim 3, wherein said plurality of acceptable key event sequences includes a sequence of said first function key, a number sequence entered via said dialing keys, one of said plurality of other keys, and said at least one memory access key.

9. The telephone according to claim 2, wherein said at least one of said alternate key sequences identifies a predetermined memory address in said memory by a number entered via said dialing keys.

10. The telephone according to claim 9, wherein said plurality of acceptable key event sequences includes a sequence of said first function key, an address number entered via said dialing keys, one of said plurality of other keys, a number sequence entered via said dialing keys, and another of said plurality of other keys.

11. The telephone according to claim 9, wherein said plurality of acceptable key sequences includes a sequence of said first function key, a number sequence entered via said dialing keys, one of said plurality of other keys and an address number entered via said dialing keys.

12. The telephone according to claim 9, wherein said plurality of acceptable key sequences includes a number sequence entered via said dialing keys and an address number entered via said dialing keys, wherein said address number and said number sequence are entered sequentially.

13. The telephone according to claim 12, further including a means for distinguishing between said address number and said number sequence.

14. The telephone of claim 13, wherein an acceptable key sequence is transferred into memory upon a pause in keystrokes of a predetermined length.

15. The telephone according to claim 1, wherein said plurality of acceptable key event sequences includes a sequence of said first function key, a number sequence entered via said dialing keys, and one of said plurality of other keys.

16. A method for entering a number sequence into an autodial memory of a telephone, wherein the telephone includes a plurality of dialing keys for dialing, a first function key for switching said telephone between an operational state, wherein said dialing keys are used to dial, and a program state wherein said dialing keys are used to enter said number sequence into said autodial memory, a plurality of keys other than said first function key and said dialing keys, for use in identifying a predetermined address in said memory when used in one of a number of alternate key sequences said method comprising the steps of:

(a) switching said telephone from said operational state to said program state;

(b) entering said number sequence, via said dialing keys;

(c) assigning said number sequence to a predetermined address in said memory using one of said number of alternate key sequences; and (d) switching said telephone back to said operational state;

wherein steps (b) and (c) can be performed in any sequence.

17. The method according to claim 16, wherein said plurality of other keys include memory access keys and step (c) includes pressing one of said memory access keys prior to step (d).

18. The method according to claim 16, wherein said plurality of other keys include memory access keys and each of said memory access keys is identifiable by an address number that can be entered via said dialing keys, and step (c) includes entering said address number, via said dialing keys, prior to step (d).

19. The method according to claim 18, further including the step of distinguishing between said address number and said number sequence.

20. The method according to claim 16, wherein step (d) includes pressing said first function key.

21. The method according to claim 16, wherein step (d) includes waiting a predetermined period of time without any key being depressed on said telephone.

22. The method according to claim 16, wherein said telephone includes a plurality of function keys other than said first function key and said step (d) includes pressing one of said plurality of function keys.

23. The method according to claim 22, wherein said method further includes the step of pressing one of said plurality of function keys at any point between step (a) and step (d).

24. A programmable telephone device operable to store a plurality of number sets in a first mode and to cause ones of said sets to be outputted from said telephone device in a second mode, said device comprising:

a memory for storing said plurality of number sets;

a keypad including keys for causing numerical values to be selected;

at least one memory assignment key operable for conditioning said memory for receiving ones of said number sets, where operation of said at least one memory assignment key and input of said number sets is independent of sequence in which said memory assignment key and said number sets are selected.

25. The telephone device according to claim 24, further including a timing evaluation program for evaluating timing between keystrokes, said timing evaluation program operable to distinguish between pauses of a first length and pauses of a differing length between keystrokes.

* * * * *